No. 690,461. Patented Jan. 7, 1902.
D. N. PHILLIPS.
GRASS UPROOTER.
(Application filed Jan. 25, 1901.)
(No Model.) 3 Sheets—Sheet 1.
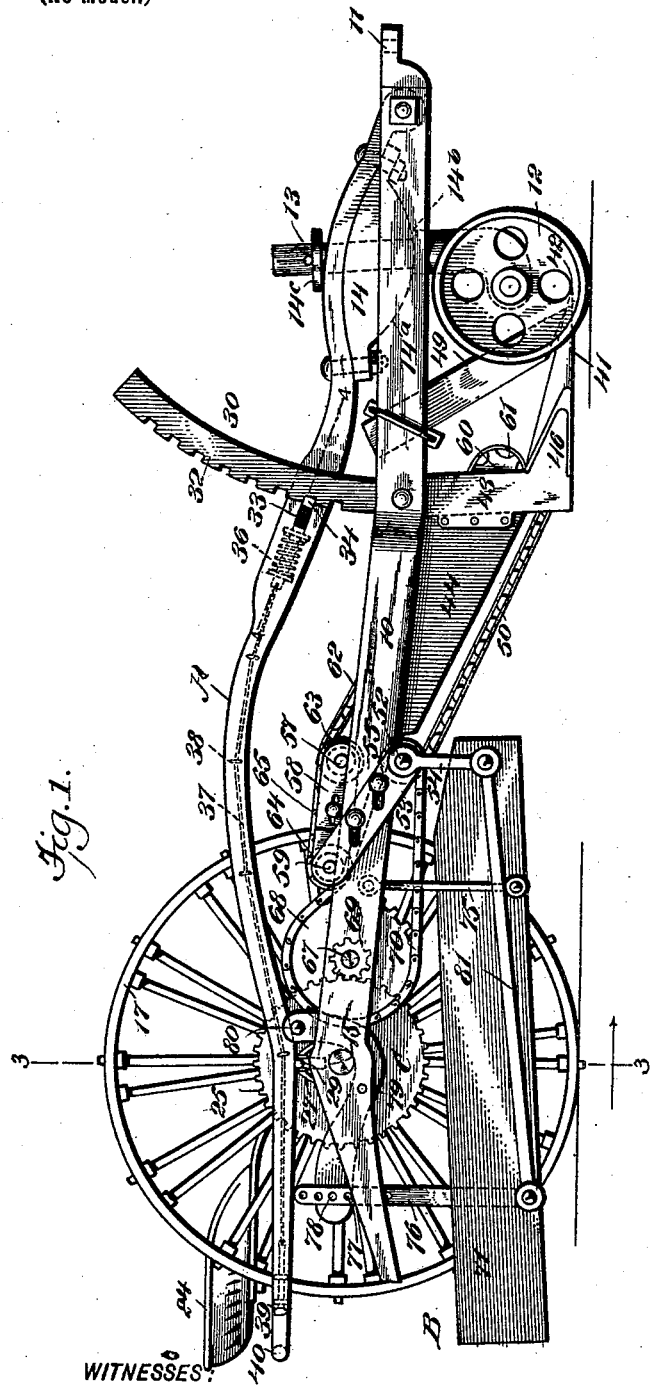
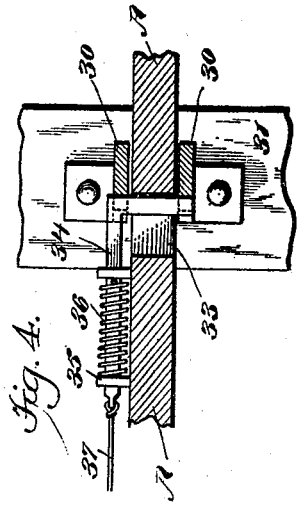
WITNESSES:
INVENTOR
David Nelson Phillips
BY
ATTORNEYS No. 690,461.  
D. N. PHILLIPS.  
GRASS UPROOTER.  
(Application filed Jan. 25, 1901.)
Patented Jan. 7, 1902.
(No Model.)
3 Sheets—Sheet 2.
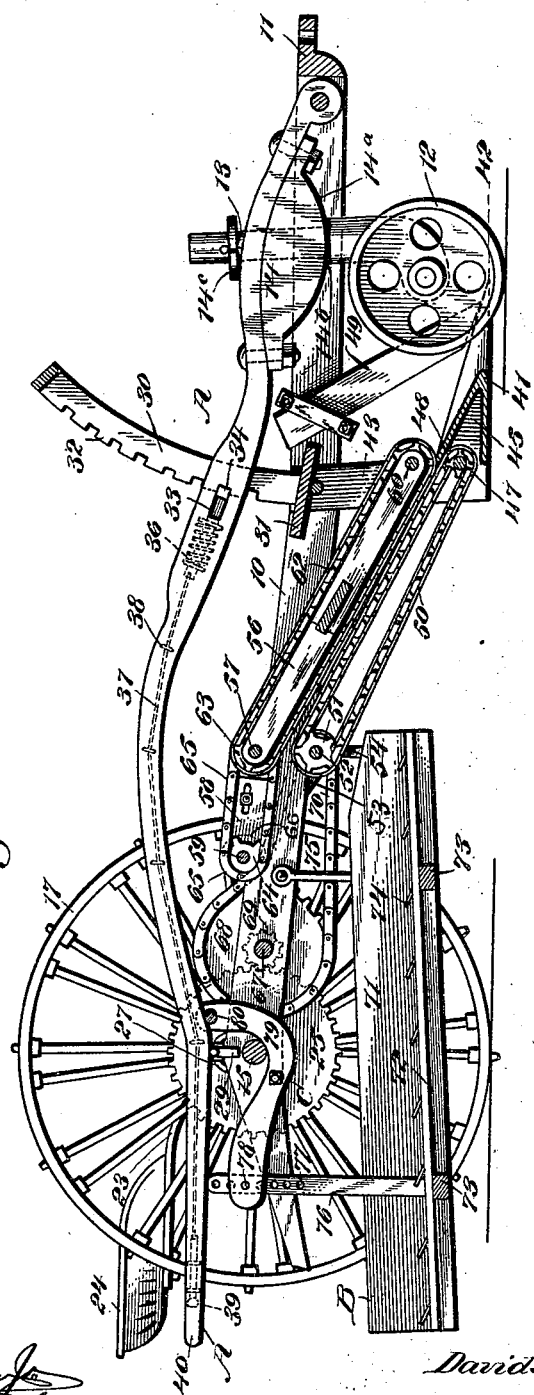
WITNESSES:
INVENTOR  
David Nelson Phillips  
BY  
ATTORNEYS No. 690,461.
D. N. PHILLIPS.
GRASS UPROOTER.
(Application filed Jan. 25, 1901.)
Patented Jan. 7, 1902.
(No Model.)
3 Sheets—Sheet 3.
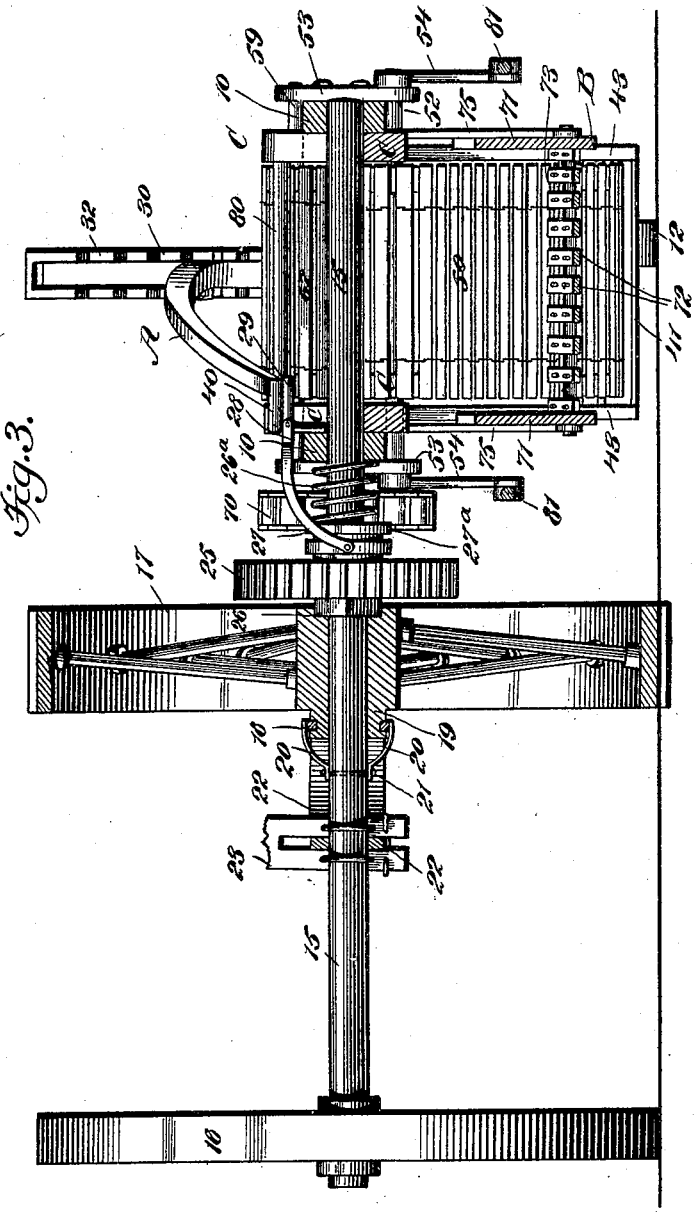
WITNESSES:
INVENTOR
David Nelson Phillips
BY
ATTORNEYS

UNITED STATES PATENT OFFICE.

DAVID NELSON PHILLIPS, OF WHITTINGTON, CANADA.

GRASS-UPROOTER.

SPECIFICATION forming part of Letters Patent No. 690,461, dated January 7, 1902.

Application filed January 25, 1901. Serial No. 44,703. (No model.)

*To all whom it may concern:*

Be it known that I, DAVID NELSON PHILLIPS, a subject of the Queen of Great Britain, and a resident of Whittington, in the Province of Ontario and Dominion of Canada, have invented a new and Improved Grass-Uprooter, of which the following is a full, clear, and exact description.

The purpose of the invention is to construct a compact, light, and durable machine adapted for uprooting such deep-rooted grasses as buffalo, twitch, or quack grass and to deliver the same comparatively free from dirt in windrows at the rear of the machine.

Another purpose of the invention is to so construct the machine that it will be under the complete control of the driver and so that the machine will not become clogged by stones, and, further, to so construct the machine that it may be employed effectually for digging potatoes and separating the earth therefrom.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of the machine. Fig. 2 is a longitudinal vertical section taken at about the central portion of the machine. Fig. 3 is a transverse vertical section taken practically on the line 3 3 of Fig. 1, and Fig. 4 is a horizontal section taken substantially on the line 4 4 of Fig. 1.

The frame consists of two side pieces 10, connected at the front by a clevis 11. The rear ends of the side bars of the frame are not connected, and preferably the rear ends of the side bars dip downwardly, so as to permit of the ready operation of parts, to be hereinafter described, for raising and lowering the sifting device of the machine. The front portion of the frame is supported by a caster-wheel 12, the stem or shank 13 whereof is carried up through the reinforced section 14 of a main lever A. This main lever is pivoted in the frame near the clevis 11, as is shown in Fig. 2, and the shape of said lever is preferably that of a compound curve; but the rear end of the lever is straight, as is also shown in Fig. 2. This shape is given to the lever in order that it may not interfere with the operative parts of the machine carried by the frame, and the reinforced section 14 of the lever is provided with a convexed under edge $14^a$, and this convexed under edge bears against a shoulder $14^b$, which is formed upon the stem or shank 13 of the caster-wheel 12, and a washer $14^c$ is placed upon the said stem or shank of the caster-wheel immediately above the main lever A. When this lever A is pressed downward at its rear end the forward end of the frame is raised, and when the lever is carried upward the caster-wheel is taken upward with it, and consequently the forward end of the frame will drop, permitting the share, to be hereinafter described, to enter the ground to a greater or less extent.

Near the rear portion of the frame a stationary axle 15 is passed through the frame. This axle extends some distance beyond the left-hand side of the frame, as is shown in Fig. 3, and the frame and parts carried thereby are balanced by this extension of the axle and by placing a wheel 16 at the left-hand end of the axle, adapted to travel on the ground, as is also shown in Fig. 3.

The main or driving wheel 17 of the machine is loosely mounted on the axle 15 adjacent to the left-hand side of the frame, as shown in Fig. 3, and this wheel, while free to turn on the axle, is prevented from moving lengthwise on the axle by fitting a collar 18 in a groove in the hub 19 of the wheel and by connecting arms 20 with the said collar, the said arms being secured to the axle by a pin 21. The left-hand side of the frame is strengthened by an arched brace 22, (shown in section in Fig. 3,) and this brace extends from the forward to the rear portion of the frame and is secured to the frame in any suitable or approved manner, being provided with a suitable opening through which the axle 15 passes. The support 23 for the driver's seat 24 is preferably secured to this arched brace 22, as indicated in Fig. 3, so that the weight of the driver assists in counterbalancing the weight of the frame and parts carried thereby.

A driving-gear 25 is loosely mounted on the axle 15 at the right-hand side of the main driving-wheel 17, and this driving-gear 25 is provided with a polygonal hub 26 at its left-hand side, adapted to enter a corresponding recess in the hub of the main driving-wheel 17, and when the hub of the gear 25 is in its recess the gear is turned as the main driving-wheel revolves.

A washer 27ª is loosely mounted on the axle 15 and engages with the outer face of the right-hand hub of the driving-gear 25, and a spring 26ª is coiled around the axle 15, having bearing against the washer 27ª and against the outer face of the left-hand side 10 of the frame. A forked shifting arm 27 is attached to the right-hand hub of the driving-gear 25 in any suitable or approved manner, and this arm curves upward in direction of the frame, extending over the axle 15. At the central portion of the bow-section of this arm 27 a bifurcated extension 28 is formed, and between the members of this extension an angle-lever 29 is pivoted, one member of which lever extends down to an engagement with the inner face of the left-hand side of the frame, and the other member extends horizontally a certain distance between the side bars of the frame, as shown in Fig. 3, and is adapted to be engaged by the straight rear portion of the main lever A of the machine. When this main lever A is pressed down, the forked arm 27 will be moved in direction of the right-hand side of the frame and the driving-gear 25 will be disconnected from the driving-wheel 17, the spring 26ª being placed under tension; but when the main lever A is released the spring 26ª will immediately place the driving-gear 25 in communication with the driving-wheel 17.

The main lever A passes between the members of a double rack 30. This rack is secured to a cross-bar 31, as shown in Fig. 2, extending from side to side of the frame. The rack is curved upward and forward, and its teeth 32 are formed upon the rear edges of its members. Immediately at the rear of the rack 30 an opening 33 is made in the main lever A, and this recess receives a short member of an angle latch-bar 34, said member extending beyond both sides of the main lever, and the other member of the latch-bar extends rearward parallel with the said main lever, as is best shown in Fig. 4. This latch-bar slides in guides 35, which are secured to the lever, and a spring 36, coiled around the outer member of the latch-bar between the guides, serves to hold the forward member normally in a space between the teeth of the rack 30, as is also shown in Fig. 4. When the main lever A is to be raised or lowered, the latch 34 is disengaged from the rack, and this is accomplished by attaching a cord 37, wire, or the like to the outer member of the latch 34, and this cord or wire, as is shown in Figs. 1 and 2, is carried to the rear end of the main lever through suitable guides 38, terminating in a finger-loop 39. It may here be remarked that the main lever A at its rear end is provided with a handle-bar 40, which extends horizontally beyond the side at which the wire or cord 37 is located, so that when the main lever A is to be raised the handle-bar 40 may be grasped and one finger of the hand grasping the bar may enter the loop 39, and thus disengage the latch from the rack almost simultaneously with raising or lowering the lever.

A share 41 is supported at the forward portion of the frame at a suitable point below the same. The cutting edge of this share or plow is inclined, the inclination being rearward in direction of the right-hand side of the machine, and at the left-hand side of the machine the share 41 is provided with a decided point 42. The share is supported by standards 43, connected with its ends in any suitable or approved manner, and these standards 43 are attached to the side bars of the frame, preferably at a point where the cross-bar 31 is located, as shown in Fig. 2. Shields 44 are preferably attached to the said shanks and to the side bars of the frame, which shields extend rearward and decrease in width in direction of the rear of the machine, as shown in Fig. 1. The object of these shields is to prevent the grass or potatoes escaping at the sides of the machine while being conducted rearward by the elevators or conveyers, to be hereinafter described.

A longitudinal groove or channel 45 is produced in the rear of the share 41, as is best shown in Fig. 2, and the ends of this groove or channel are closed by foot-sections 46, formed at the bottom of the standards 43, as illustrated in Fig. 1. A shaft 47 is journaled in the groove or channel of the share 41, and sprocket-wheels 48 are secured upon this shaft. The share may be made to enter the ground to any desired extent by manipulating the main lever A in the manner heretofore described, and the grass or vines where they are tangled are cut by a colter 49, attached to the left-hand side bar of the frame, which colter extends down to the point 42 of the share, as is shown in Figs. 1 and 2. The chains attached to an endless elevator or conveyer belt are made to engage the sprocket-wheels 48 on the shaft 47, and this conveyer or elevator belt is carried upward and rearward, and the chain portions thereof are made to engage with sprocket-wheels 51, located on a shaft 52, which shaft is journaled in the lower ends of plate-hangers 53, adjustably attached to the outer side faces of the side bars of the frame, as shown in Fig. 1. These plate-hangers are placed obliquely upon the side bars and extend beyond the upper and lower edges of said bars. At each outer end of the shaft 52 a crank-arm 54 is secured, adapted for connecting with the sifting and distributing device, to be hereinafter described. Near the right-hand end of the shaft 52 a sprocket-wheel 55 is secured. (Shown in dotted lines in Fig. 1.)

A frame 56 is located above and is normally parallel with the conveyer or elevator belt 50, as shown in Fig. 2. This frame 56 is pivoted at its upper end on a shaft 57, which is above the top portion of the frame and is journaled in adjustable plate-hangers 58, which hangers 58 are supported by a rear shaft 59. This shaft 59 is journaled in the upper end portions of the outer plate-hangers 53, as shown in Fig. 1. The shaft 57 has bearing at its ends on the upper portion of the frame, and the said shaft 57 is free to be raised and lowered, since the inner plate-hangers 58 are loosely mounted on the shaft 59. At the lower end of the frame 56 a shaft 60 is journaled, and this shaft is provided at each end outside of the frame with a sprocket-wheel 61, and the chain-sections of the endless conveyer or elevator belt 62 are passed over these sprocket-wheels 61 and over corresponding sprocket-wheels secured upon the shaft 57. Thus it will be observed that two conveyer or elevator belts are provided, leading upward and rearward from the share, one above the other, and these belts are adapted to move in opposite directions in a manner to be hereinafter set forth. It will be further observed that the frame supporting the upper conveyer or elevator belt is free to move at its lower end, which portion extends over the share a certain distance. Therefore the upper conveyer or elevator belt and its frame will accommodate itself to any bulk of material that may be received between its lower stretch and the upper stretch of the lower conveyer or elevator belt, thereby avoiding any clogging of the machine by stones or other heavy material which may find its way to the belts.

Auxiliary sprocket-wheels 63 are secured to the shaft 57 adjacent to the upper plate-hangers 58, as shown in dotted lines in Fig. 1. Corresponding sprocket-wheels 64 are secured on the shaft 59, and corresponding sprocket-wheels on the two shafts 57 and 59 are connected by belts 65, as illustrated in Figs. 1 and 2. Thus the upper conveyer or elevator belt is driven from the shaft 59, and this shaft 59 at its right-hand end is provided with a driving-sprocket 66. (Shown in dotted lines in Fig. 2.)

The two conveyer or elevator belts are driven in the following manner: A shaft 67 is journaled in the frame at the rear of the shaft 59, and this shaft 67 carries a large sprocket-wheel 68 and a pinion 69. Usually the sprocket-wheel and pinion are connected, and the pinion 69 meshes with the driving-gear 25, heretofore described. A belt 70 is passed over the large sprocket-wheel 68, and this belt engages with the under portion of the sprocket-wheel 66 on the shaft 59, connected with the upper conveyer or elevator, and passes over the sprocket-wheel 55 on the shaft 52, carrying the upper portion of the lower elevator or conveyer belt. Under this arrangement of driving mechanism it will be observed that the driving-shafts of the two elevator or conveyer belts move in opposite directions and that the opposing stretches of the two belts therefore travel in the same direction and any material placed between these two opposing stretches of the belts will be carried upward and rearward and will be delivered to the distributing and sifting box B.

The sifting-box B comprises two sides 71 and a bottom 72, the bottom consisting of cross-bars 73, connecting the side pieces, and slats 74, which are laid upon the cross-bars. Both ends of the box are therefore open, and the slats are placed at such a distance apart that potatoes will not pass between them when the device is utilized for digging potatoes, neither can grass pass; but sufficient space is left between the slats to permit the dirt to sift from the box as the box is given a reciprocating end movement. The box is supported at its front end from the main frame of the machine by links 75, pivotally attached to the frame and to the box, and at the rear the said box B is supported by arms 76, which are secured to the sides of the box and extend upward and at their upper ends are provided with series of apertures 77.

A rocking frame is pivoted to the main frame near the axle 15, as shown in Figs. 1 and 2, and this rocking frame is connected with the arms 76 and consists of curved side bars 79, connected at their upper ends by a cross-bar 80, upon which cross-bar the main lever A is adapted to rest. The arms 76 are adjustably attached to the rear ends of the side members 79 of the rocking frame C by means of pins 78 passing through said members and through any one of the apertures 77.

In operation when the machine is to be taken to or from a field the main lever A is pressed down, whereupon the forward portion of the main frame is raised, thus carrying the share 41 from the ground, and the forward portion of the rocking frame C is depressed, causing the sifting and distributing box to be elevated. When the field is reached, the main lever A is raised, thus permitting the box B to drop, and the share will enter the ground more or less deeply, according to the extent to which the main lever A is raised. Reciprocating motion is imparted to the sifting and distributing box B by pivoting the connecting-rods 81 to the side portions of the box and to the crank-arms 54, extending from the shaft 52 of the lower elevator 50.

It will be observed that this machine is exceedingly light; yet it is simple, durable, and effective in operation and may be utilized for digging potatoes as well as for uprooting grass.

Having thus described my invention, I claim as new and desire to secure by Letters Patent—

1. In a machine of the character described, the combination with a wheel-supported frame, of a standard secured to the frame, a share at the lower end of the standard and having a channel at its rear end, upwardly and rearwardly inclined elevators arranged one above the other, the lower end of the lower elevator being mounted in the channel of the share, and the upper elevator being free to move vertically at its lower end, means for operating the elevators from one of the supporting-wheels, a suspended sifting and distributing box, and means for reciprocating the said box from one of the elevators, as set forth.

2. In a machine of the character described, the combination with a wheel-supported frame, of a share at the lower end of a standard secured to the frame, an upwardly and rearwardly inclined elevator having one of its shafts mounted in the share and its other in the frame, a swinging frame above the elevator, a second elevator carried by the swinging frame, a shaft geared with the upper shaft of the second elevator and upon which shaft the swinging frame is mounted, and means for operating the upper shaft of the frame and the upper shaft of the first-named elevator from one of the supporting-wheels, as set forth.

3. In a machine of the character described, the combination with a wheel-supported frame, of a share at the lower end of a standard secured to the frame, an upwardly and rearwardly inclined elevator having one of its shafts mounted in the share and its other in the frame, a swinging frame above the elevator, an adjustable bearing for the upper shaft of said frame, a second elevator carried by the swinging frame, a shaft geared with the upper shaft of the swinging frame, a second shaft geared with one of the supporting-wheels, and means for operating the upper shafts of the elevators from the shaft geared with the supporting-wheel substantially as described.

4. A wheel-supported frame, a share, cooperating elevators arranged one above the other, and extending upward and rearward from the share, the upper elevator being pivoted at its discharge end and free at its receiving end, means for driving the elevators from a supporting-wheel of the machine, opposing stretches of the elevators moving in the same direction, a rocking frame pivoted to the main frame, a reciprocating sifting and distributing box supported partially from the main frame and partially from the rocking frame, means for operating the sifting-box from one of the elevators, and a main lever pivoted to the main frame, capable of bearing on the rocking frame to elevate the said box, as described.

5. In a machine of the class described, the combination with a wheel-supported frame, and a share at the forward part of the frame, of adjustable and obliquely-arranged hangers carried by the frame, an inclined elevator having one shaft mounted in the share and the other in the lower end of the hanger, a second hanger mounted in the upper end of the first-named hanger, a frame pivoted to the second hanger and extending downwardly above the elevator, a second elevator mounted in the pivoted frame, and means for operating the said elevators from one of the supporting-wheels, as set forth.

6. In a machine of the class described, the combination with a wheel-supported frame, and a share at the forward part of the frame, of an adjustable and obliquely-arranged hanger carried by the frame, an inclined elevator having one shaft mounted in the share and the other in the lower end of the hanger, a shaft mounted in the upper end of the first-named hanger, a second hanger mounted at one end on said shaft, a frame pivoted to the free end of the second hanger and extending downwardly above the elevator, a second elevator mounted in the pivoted frame, gearing between the shaft on which the second hanger is mounted and the upper shaft of the second elevator, a shaft mounted in the main frame and geared with one of the supporting-wheels, and means for operating the shaft in the upper ends of the first-named hanger and the upper shaft of the first-named elevator from the shaft mounted in the main frame, as set forth.

7. In a machine of the character described, a wheel-supported frame, a share attached to the said frame, and provided with a longitudinal chamber in its rear portion, a shaft located within the said chamber, an opposing shaft carried by an adjustable support on the frame, an elevator carried by the said shafts, a frame located above the elevator connected with the share, an adjustable pivotal support for the upper portion of the frame, the lower portion of the frame being free to move to and from the said elevator, and an elevator carried by the said frame, as and for the purpose specified.

8. In a machine of the character described, a drive-shaft, hangers pivoted on the drive-shaft, a second shaft carried by the hangers, a driving connection between the second shaft and drive-shaft, an elevator-frame pivoted on said second shaft, the elevator being driven therefrom, the opposite end of the said elevator being free to move vertically, a second conveyer located below the first conveyer in substantially close engagement therewith, means for driving the second conveyer, and a share the upper surface of which leads to the space between the two conveyers, for the purpose described.

9. A machine of the class described, comprising a wheel-supported frame, the front supporting-wheel being a caster-wheel, a share carried by the frame, elevators arranged one above the other and extending upwardly and rearwardly from the share, the upper elevator being pivoted at its discharge end and free at its receiving end, means for operating the elevators from one of the supporting-wheels, a rocking frame, a reciprocating sifting-box having one end supported from the rocking frame, means for operating the sifting-box from one of the elevators, and a lever pivoted at its front end to the front end of the main frame, and carrying the caster-wheel, the rear end of the lever being adapted to engage the rocking frame, as set forth.

In testimony whereof I have signed my name to this specification in the presence of two subscribing witnesses.

DAVID NELSON PHILLIPS.

Witnesses:
JOHN JOHNSTON,
GEO. ROBB.